(12) United States Patent
Tu

(10) Patent No.: US 7,442,032 B2
(45) Date of Patent: Oct. 28, 2008

(54) INJECTION MOLD HAVING A CAM ACTUATOR TO MOVE A SLIDING BLOCK

(75) Inventor: Chien-Sheng Tu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 109 days.

(21) Appl. No.: 11/309,673

(22) Filed: Sep. 8, 2006

(65) Prior Publication Data

US 2007/0148281 A1 Jun. 28, 2007

(30) Foreign Application Priority Data

Dec. 23, 2005 (CN) .................... 2005 1 0121242

(51) Int. Cl.
*B29C 45/44* (2006.01)

(52) U.S. Cl. ................ 425/556; 264/318; 425/DIG. 5; 425/DIG. 58

(58) Field of Classification Search ................. 425/556, 425/DIG. 5, DIG. 58; 264/318
See application file for complete search history.

(56) References Cited

U.S. PATENT DOCUMENTS

| | | | | |
|---|---|---|---|---|
| 1,349,122 | A * | 8/1920 | Edlund | 425/DIG. 58 |
| 6,116,891 | A * | 9/2000 | Starkey | 425/DIG. 58 |
| 6,450,797 | B1 * | 9/2002 | Joseph | 425/DIG. 58 |

* cited by examiner

*Primary Examiner*—Tim Heitbrink

(57) ABSTRACT

An injection mold includes a first mold part (10), a second mold part (50) mating with the first mold part, a sliding block (20), a cam actuator (30), and a rack (40). The sliding block is movably disposed on the first mold part. The cam actuators resist the sliding block for driving the sliding block to move along the first mold part. The rack is fixed to the second mold part for actuating the cam actuator.

20 Claims, 6 Drawing Sheets

INJECTION MOLD HAVING A CAM ACTUATOR TO MOVE A SLIDING BLOCK

FIELD OF THE INVENTION

The present invention generally relates to injection molds and, more particularly, to an injection mold with a sliding block.

DESCRIPTION OF RELATED ART

Injection molding is a conventionally known and commonly used manufacturing process. A typical injection mold has a sliding block for injection molding complicated parts that have lateral holes or recesses. The sliding block can be moved relative to a die disposed in the mold by an actuator member, thus a molded part with a desired shape can be formed. The actuator member for moving the sliding block is very important to the accuracy of the shape of the molded part.

Referring to FIG. 6, a conventional injection mold includes an upper mold die 81, a lower mold die 82 with a core 821, and two sliding blocks 83 movably disposed on two sides of the core 821 respectively. The upper mold die 81 has one pair of symmetrical slanting slots 811 defined for mounting a pair of guiding rods 812 therein. Each of the sliding blocks 83 has a slanting guiding hole 831. Each of the guiding rods 812 engages in a corresponding slanting guiding hole 831. When the upper mold die 81 moves toward the lower mold die 82, the guiding rods 812 actuate the sliding blocks 821 to move towards the core 821 until the upper mold die 81 engages with the lower mold die 82. However, the manufacturing process of the injection mold is complicated. Furthermore, abrasion of the guiding rods 812 and the slanting guiding hole 831 may cause the guiding rods 812 to become misaligned with or a poor fit to the slanting guiding hole 831, thus it may be difficult to reach a desired accuracy for molded parts.

What is needed, therefore, is a simple injection mold, which can reach high accuracy for molded parts.

SUMMARY OF THE INVENTION

In one embodiment thereof, an injection mold is provided. The injection mold includes a first mold part, a second mold part mating with the first mold part, a sliding block, a cam actuator, and a rack. The sliding block is movably disposed on the first mold part. The cam actuator resists the sliding block for driving the sliding block to move along the first mold part. The rack is fixed to the second mold part for actuating the cam actuator.

Other advantages and novel features will become more apparent from the following detailed description of preferred embodiment when taken in conjunction with the accompanying drawings.

BRIEF DESCRIPTION OF THE DRAWINGS

Many aspects of the injection mold can be better understood with reference to the following drawings. The components in the drawings are not necessarily drawn to scale, the emphasis instead being placed upon clearly illustrating the principles of the injection mold. Moreover, in the drawings, like reference numerals designate corresponding ms throughout the several views.

DETAILED DESCRIPTION OF THE INVENTION

Figure 1:
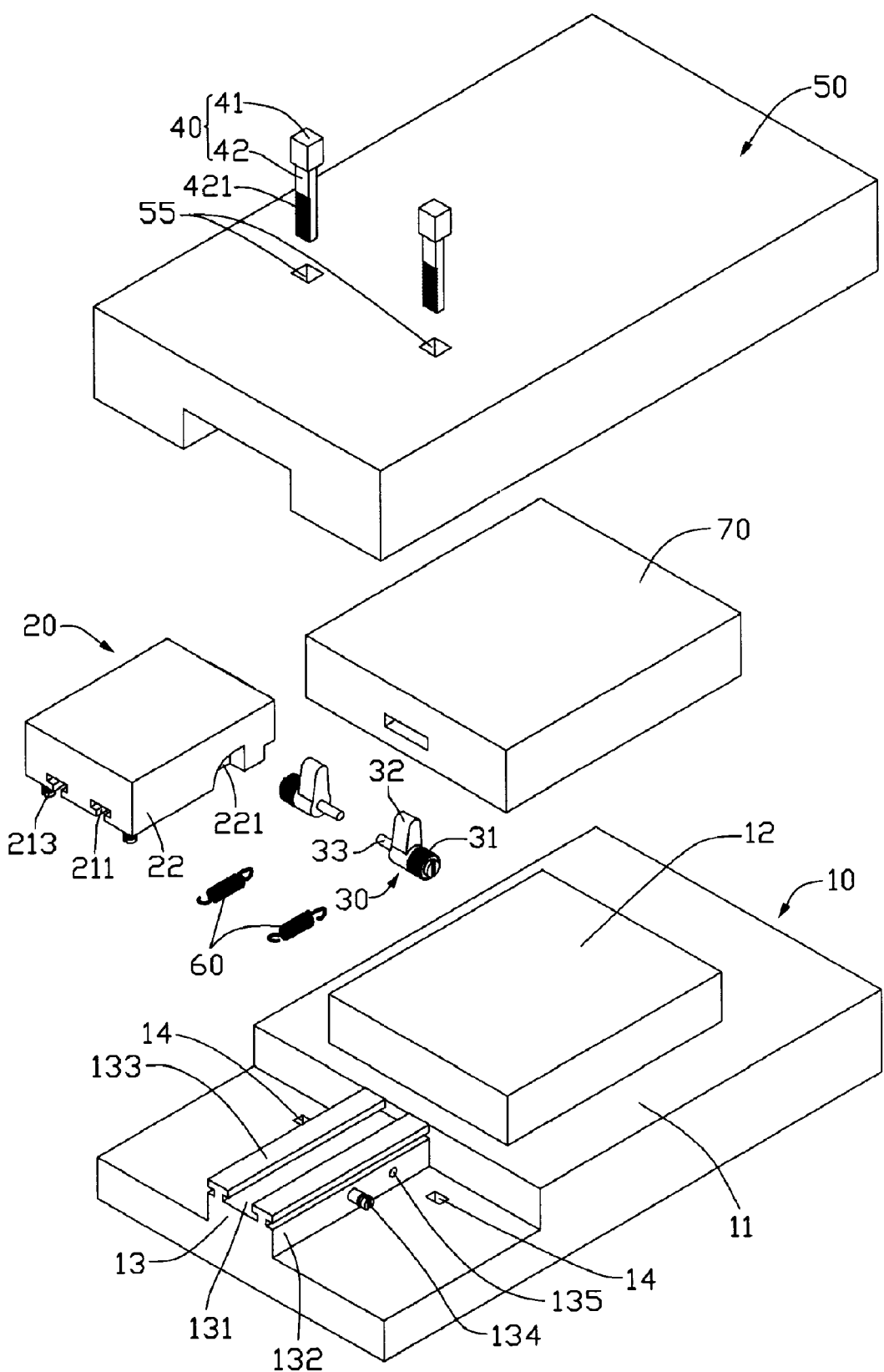
FIG. 1 is an exploded, perspective view of an embodiment of the injection mold.

Referring to FIG. 1, an injection mold in accordance with a preferred embodiment includes a male mold part 10, a sliding block 20, two cam actuators 30, two racks 40, a female mold part 50, and two springs 60.

The male mold part 10 is provided with a top wall 11. The top wall 11 has a mold core 12 mounted thereon, a sliding guide member 13 disposed at one side of the mold core 12, and a pair of through holes 14 defined either side of the sliding guide member 13. The sliding member 12 serves to slidably fit the sliding block 20, and the sliding guide member 13 is provided with a guiding wall 131 and one pair of opposing first sidewalls 132. The guiding wall 131 has a pair of parallel linear rails 133 formed thereon. Each of the rails 133 has a T-shaped cross section. Each of the first sidewalls 132 has a first holding pin 134 and a positioning hole 135 disposed thereon. The first holding pin 134 serves to hold one of the springs 60, and the positioning hole 135 serves to fix a corresponding one of the cam actuators 30 on one of the sidewalls 132.

Figure 2:
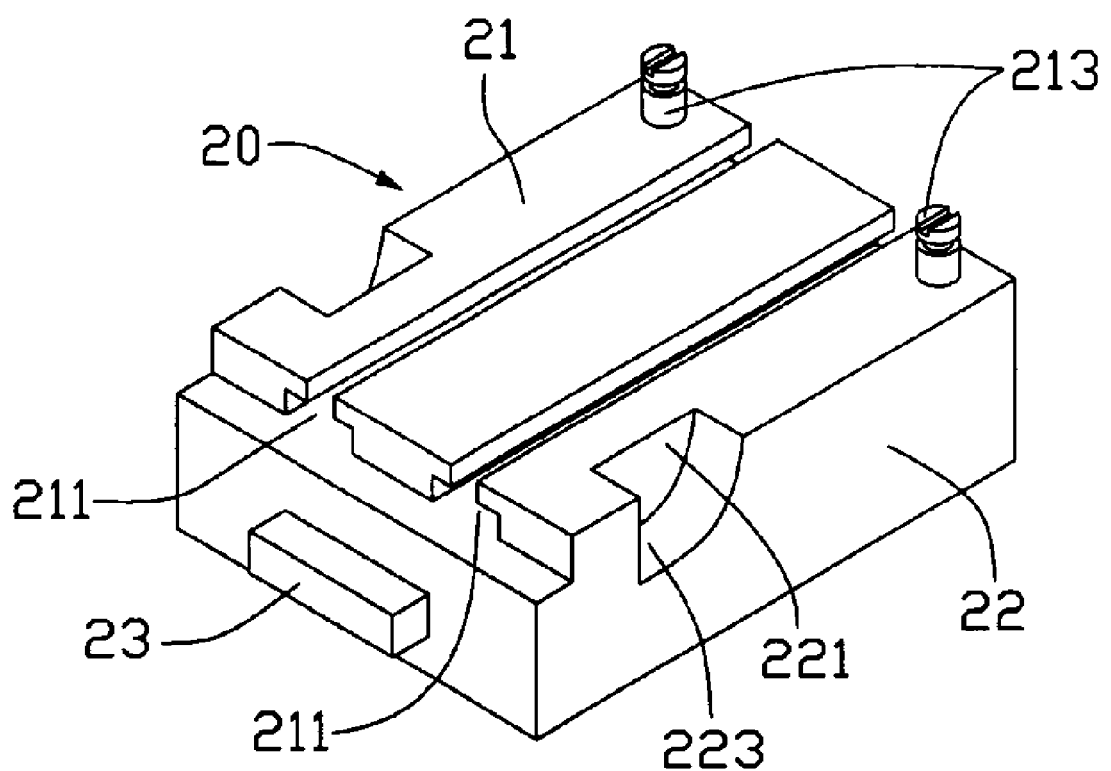
FIG. 2 is a schematic view of the sliding block of the injection mold in FIG. 1.

Referring to FIG. 1 and FIG. 2, the sliding block 20 is provided with a sliding wall 21, one pair of opposing second sidewalls 22, and a molding pin 23 for forming a part 70 of desired shape. The sliding wall 21 has a pair of T-shaped linear sliding grooves 211 formed thereon and a pair of second holding pins 213 disposed thereon. The sliding grooves 211 are configured for accommodating the rails 133. The second holding pins 213 are contiguous with the second sidewalls 22 and serve to hold the springs 60. Each of the second sidewalls 22 has an arcuate groove 221 formed thereon. The arcuate groove 221 is provided with an arcuate grooved wall 223. The molding pin 23 is disposed on one end of the sliding block 20 and serves for molding a hole on the part 70 being molded by the injection mold.

Each of the cam actuators 30 includes a gear portion 31, a cam portion 32, and a positioning shaft 33. The gear portion 31 has a cog surface consisting of an essentially smooth first surface and a second surface advantageously occupying about 20% to 80%, of the cog surface. The second surface has a plurality of teeth radially formed thereon, thereby permitting the engagement of the gear portion 31 with a corresponding one of the racks 40. The cam portion 32 is integrally formed on the first surface of the gear portion 31. The gear portion 31 is rotatably coiled around the positioning shaft 33, with one end of the positioning shaft 33 extending out of the gear portion 31. The end of the positioning shaft 33 extending out of the gear portion 31 can be secured in the positioning hole 135. Thus the gear portion 31 and the cam portion 32 can be fixed on the first sidewalls 132 and rotate around the positioning shaft 33.

Each of the racks 40 includes a securing portion 41 and engaging portion 42. The engaging portion 42 has a strip-like shape, and has an engaging side 421 with a plurality of teeth formed thereon. One end of the engaging portion 42 can be received in a corresponding one of the through holes 14 of the male mold part 10.

Figure 3:
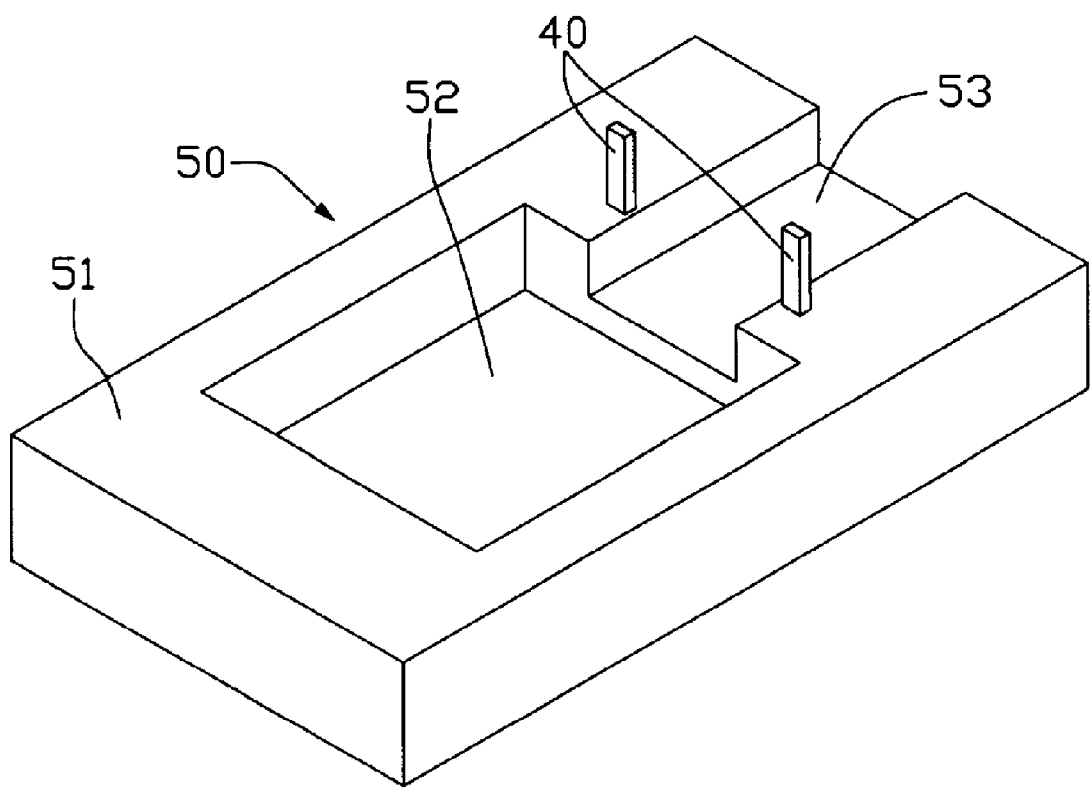
FIG. 3 is a schematic view of the female mold part of the injection mold in FIG. 1.

Referring to FIG. 1 and FIG. 3, the female mold part 50, which mates with the male mold part 10, is provided with a working wall 51 and a recessed portion 52 corresponding to the top wall 11 and the mold core 12 respectively. The working wall 51 has a receiving groove 53 corresponding to the sliding guide member 13, and two positioning grooves 55. The receiving groove 53 is formed at one side of the recessed portion 52 for receiving the sliding guide member 13 when the injection mold is closed. The positioning grooves 55 are disposed at two sides of the receiving groove 53 respectively, and each of positioning grooves 55 serves to secure the securing portion 41 of a corresponding one of the racks 40.

Figure 4:
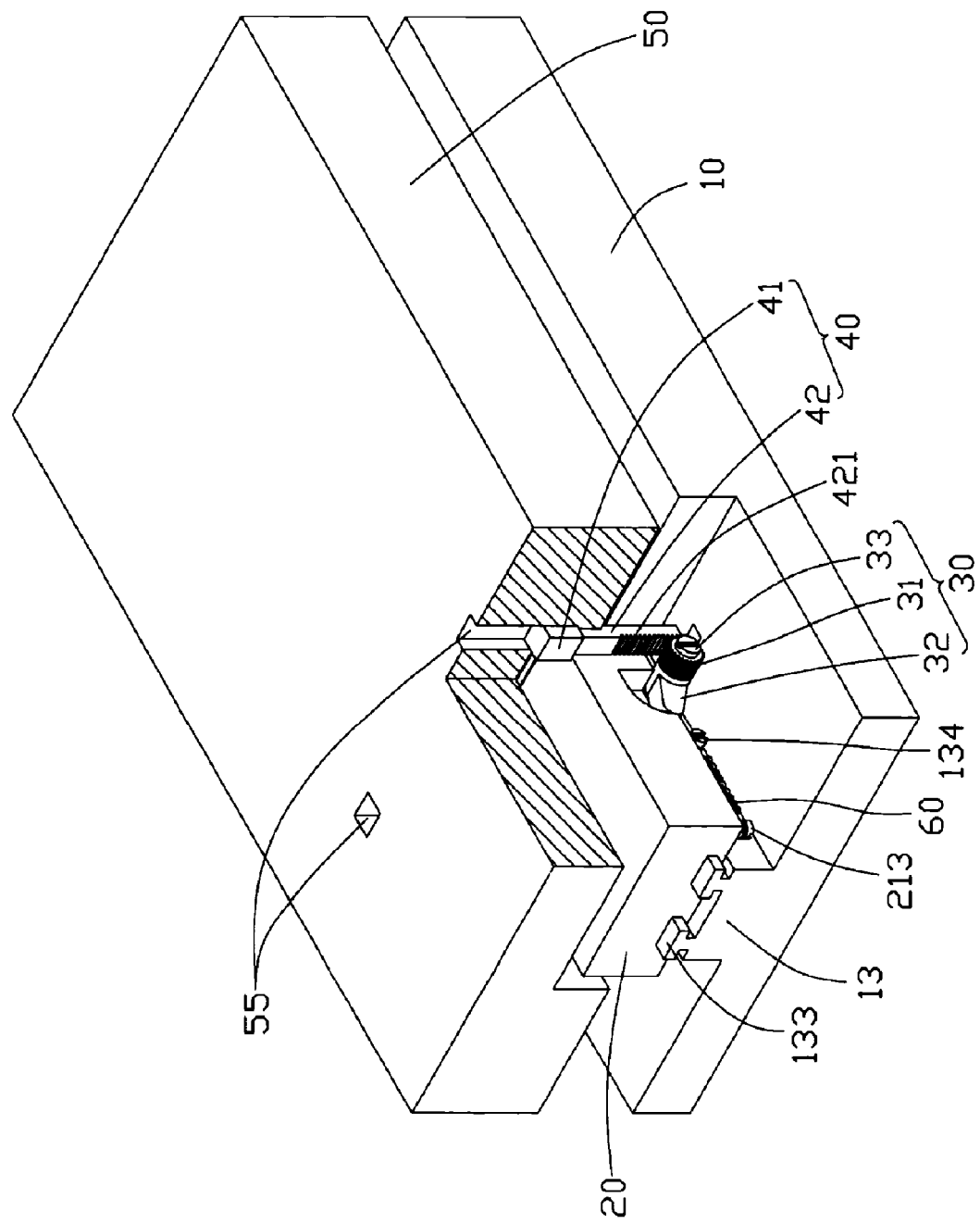
FIG. 4 is a cut-away view of the injection mold, showing an open state.
Figure 5:
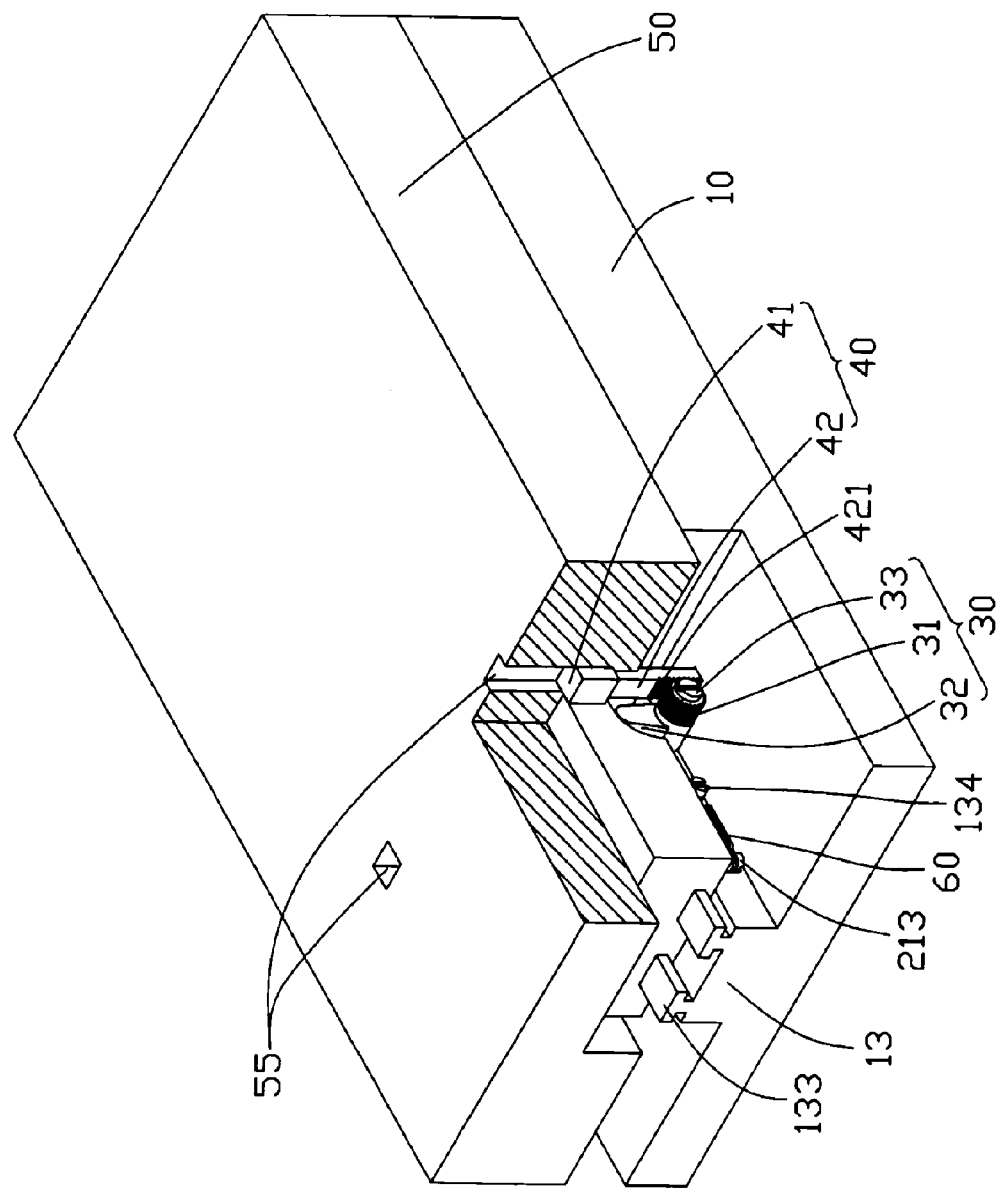
FIG. 5 is a cut-away view of the injection mold, showing a closed state.
Figure 6:
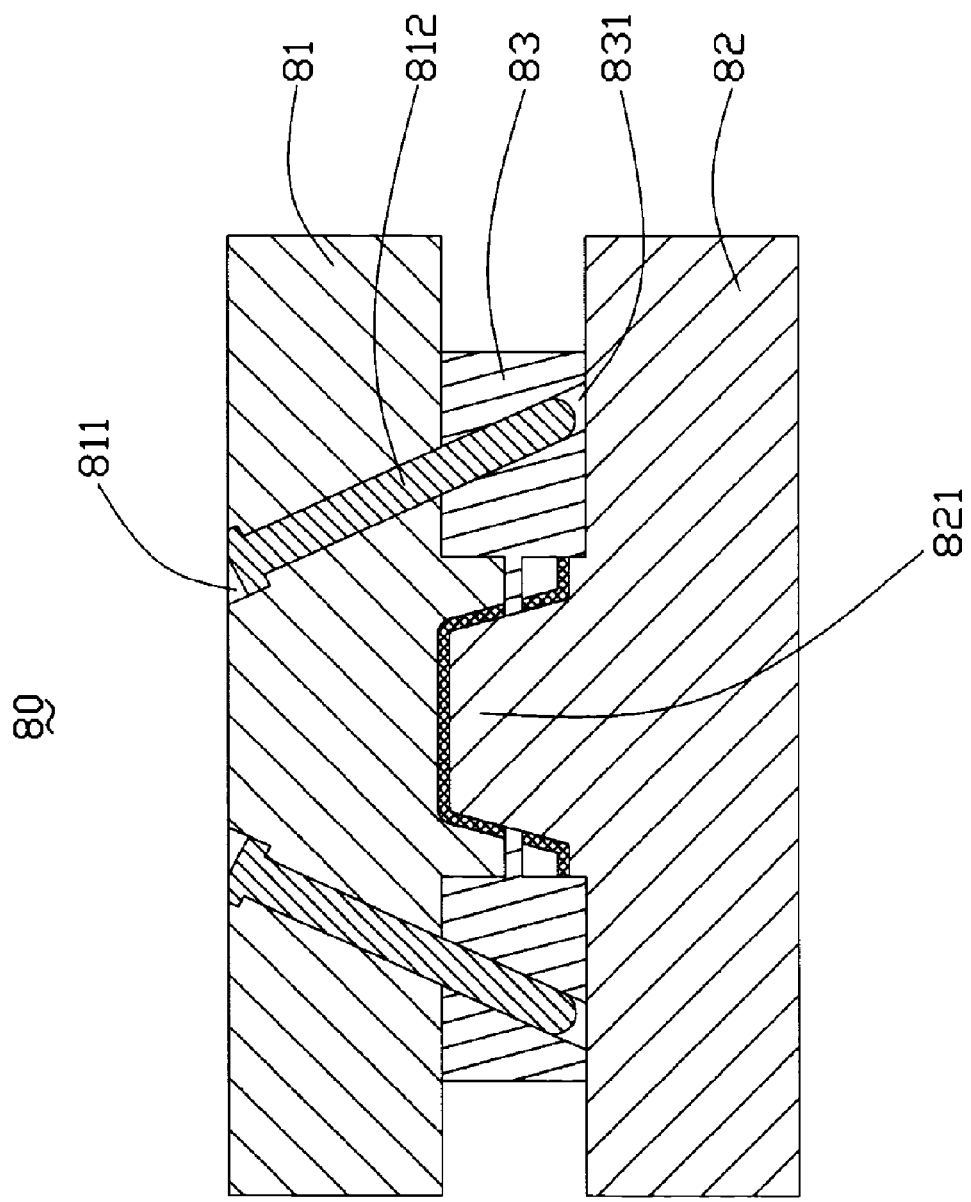
FIG. 6 is a schematic view of a conventional injection mold with sliding blocks.

Referring to FIG. 4 and FIG. 5, in assembly of the injection mold, the sliding block 20 is engaged with the sliding guide member 13, with the molding pin 23 facing towards the mold core 12. The rails 133 are each slidably received in a corresponding sliding groove 211. The second holding pins 213 of the sliding block 20 are hung at two sides of the sliding guide member 13. The first holding pin 134 holds one end of a corresponding one of the springs 60, and one of the second holding pins 213 holds the other end of the corresponding one of the springs 60. The end of the positioning shaft 33 extending out of the gear portion 31 is secured in the positioning hole 135, with the cam portion 32 resisting the arcuate grooved wall 223 of the arcuate groove 221. The securing portion 41 of one of the racks 40 is secured in a corresponding one of the positioning grooves 55 of the female mold part 50, with the engaging portion 42 engaging with the gear portion 31 of one of the cam actuators 30 and aligning with a corresponding one of the through holes 14 of the male mold part 10. The male mold part 10, the sliding block 20, the cam actuators 30, the racks 40, the female mold part 50, and the springs 60 are assembled together thereat.

When the injection mold is being closed, the female mold part 50 moves toward the male mold part 10 along a first axis that is parallel to the engaging side 421 of the racks 40. Simultaneously, the springs 60 apply a pulling force to draw the sliding block 20 toward the mold core 12 along a second axis. The second axis is positioned parallel to the rails 133 and perpendicular to the first axis. A mold cavity can thereby be defined by the mold part 10, the female mold part 50, and the sliding block 20, with the molding pin 23 of the sliding block 20 extending into the molding cavity. Molten materials can be filled into the mold cavity to form the part 70.

When the injection mold is being opened, the female mold part 60 moves away from the male mold part 10 along the first axis, simultaneously the rack 40 actuates the gear portion 31 and the cam portion 32 of the cam actuators 30 to rotate around the positioning shaft 33. The cam portion 32 may push the sliding block 20 apart from the mold core 12 along the second axis with the springs 60 being extended, thereby the molded part 70 can be taken away from the injection mold.

It should be understood that the springs 60 could be omitted in the injection mold. When the injection mold is being closed, the racks 40 can drive the cam actuators 30 to rotate around the positioning shaft 33, and the cam actuators 30 can push the sliding block 20 to move towards the mold core 12.

It should be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An injection mold, comprising:
   a first mold part;
   a second mold part mating with the first mold part;
   a sliding block movably disposed on the first mold part said sliding block forming a mold cavity with the first and second mold parts;
   a rotary cam actuator on the first mold part resisting the sliding block for driving the sliding block to move along the first mold part; and
   a rack fixed to the second mold part and configured for actuating the cam actuator to move the sliding block when the first mold part and the second mold part move relative to each other.

2. The injection mold as claimed in claim 1, wherein the cam actuator is mounted on the first mold part.

3. The injection mold as claimed in claim 2, wherein the cam actuator includes a gear portion, a cam portion, and a positioning shaft, the cam portion resists the sliding block, the gear portion engages with the rack, and the positioning shaft is fixed to the first mold part.

4. The injection mold as claimed in claim 3, wherein the sliding block has a sidewall, each of the sidewall has an arcuate groove formed thereon, the arcuate groove is provided with an arcuate grooved wall, with the cam portion resisting the arcuate grooved wall.

5. The injection mold as claimed in claim 3, wherein the gear portion has a cog surface consisting of an essentially smooth first surface and a second surface, the second surface has a plurality of teeth radially formed thereon, the cam portion is integrally formed on the first surface, and the gear portion is rotatably coiled around the positioning shaft.

6. The injection mold as claimed in claim 5, wherein the second surface occupies about 20% to 80%, axially, of the cog surface.

7. The injection mold as claimed in claim 5, wherein the rack has an engaging side with a plurality of teeth formed thereon, the engaging side is engaged with the gear portion of the cam actuator.

8. The injection mold as claimed in claim 1, wherein the first mold part has a top wall, the top wall has a mold core mounted thereon, and a sliding guide member disposed at one side of the mold core.

9. The injection mold as claimed in claim 8, wherein the sliding guide member is provided with a guiding wall, the guiding wall has two parallel linear rails formed thereon, each of the rails has a T-shaped cross section, the sliding block has two T-shaped linear sliding grooves formed thereon, each of the rails is slidably received in a corresponding one of the sliding grooves.

10. The injection mold as claimed in claim 8, wherein the first mold part has a first sidewall, the first sidewall has a first holding pin disposed thereon, the sliding block has a second sidewall, the second sidewall has a second holding pin disposed thereon, the first holding pin and the second holding pin are connected with a spring.

11. An injection mold, comprising:
   a first mold member having a mold core disposed thereon;
   a second mold member having a recessed portion positioned corresponding to the mold core, the second mold member coupled to the first mold member in a manner so as to allow their separation along a first axis;
   a sliding block disposed between the first mold member and the second mold member and being movable along a second axis distinct from the first axis, a mold cavity being defined between the first mold member, the second mold member and the sliding block; and a driving assembly including a first driving part fixed to the first mold member and a second driving part fixed to the second mold member;

wherein the first driving part has a gear portion and a rotary cam portion, the second driving part engages with the gear portion in a manner so as to drive a corresponding one of the first driving part, the cam portion resists the sliding block in a manner so as to drive the sliding block to move along the second axis when the first and second mold members move relative to each other along the first axis.

12. The injection mold as claimed in claim 11, wherein the gear portion has a cog surface consisting of an essentially smooth first surface and a second surface, the second surface has a plurality of teeth radially formed thereon, the cam portion is integrally formed on the first surface, and the gear portion is fixed to the first mold member.

13. The injection mold as claimed in claim 11, wherein the first axis is perpendicular to the second axis.

14. The injection mold as claimed in claim 11, wherein the sliding block has a sidewall, the sidewall has an arcuate groove formed thereon, the arcuate groove is provided with an arcuate grooved wall, with the cam portion of the first driving part resisting the arcuate grooved wall.

15. The injection mold as claimed in claim 11, wherein the gear portion has a cog surface consisting of an essentially smooth first surface and a second surface, the second surface has a plurality of teeth radially formed thereon, the cam portion is integrally formed on the first surface, the gear portion is rotatably coiled around a shaft, the shaft is fixed to the first mold member.

16. The injection mold as claimed in claim 15, wherein the second surface occupies about 20% to 80%, axially, of the cog surface.

17. The injection mold as claimed in claim 15, wherein the second driving part is a rack, the second driving part has an engaging side with a plurality of teeth formed thereon, the engaging side is engaged with the gear portion of the first driving part.

18. The injection mold as claimed in claim 11, wherein the first mold member has a top wall, the top wall has a mold core mounted thereon, and a sliding guide member for guiding the sliding block.

19. The injection mold as claimed in claim 18, wherein the sliding guide member is provided with a guiding wall, the guiding wall has two parallel linear rails formed thereon, each of the rails has a T-shaped cross section, the sliding block has two T-shaped linear sliding grooves formed thereon corresponding to the rails, the rails are each slidably received in a corresponding one of the sliding grooves.

20. The injection mold as claimed in claim 18, wherein the first mold member has a first sidewall, the first sidewall has a first holding pin disposed thereon, the sliding block has a second sidewall, the second sidewall has a second holding pin disposed thereon, the first holding pin and the second holding pin are connected with a spring.

* * * * *